United States Patent [19]

Matalis et al.

[11] 4,416,573
[45] Nov. 22, 1983

[54] PLOW BOLT

[75] Inventors: John A. Matalis, Lombard; Richard L. Heinie, Havana; Duane E. Wegerer, Canton, all of Ill.

[73] Assignee: International Harvester Co., Chicago, Ill.

[21] Appl. No.: 291,709

[22] Filed: Aug. 10, 1981

[51] Int. Cl.³ ............................................. F16B 00/00
[52] U.S. Cl. .................................... 411/378; 411/103
[58] Field of Search ............... 411/103, 360, 361, 378, 411/402

[56] References Cited

U.S. PATENT DOCUMENTS

| 281,564 | 7/1883 | Sanders | 411/402 |
|---|---|---|---|
| 3,556,570 | 1/1971 | Cosenza | 411/176 X |
| 3,821,871 | 7/1974 | Schmitt | 411/424 X |
| 4,326,825 | 4/1982 | Volkmann et al. | 411/424 X |

Primary Examiner—Wayne L. Shedd
Attorney, Agent, or Firm—F. David AuBuchon; Dennis K. Sullivan

[57] ABSTRACT

A bolt for attaching an earth engaging plow component to a plow frog has an improved head configuration represented by planar surfaces having inclined angular displacement similar to the slope of the truncated cone portion of the plow bolt head.

1 Claim, 4 Drawing Figures

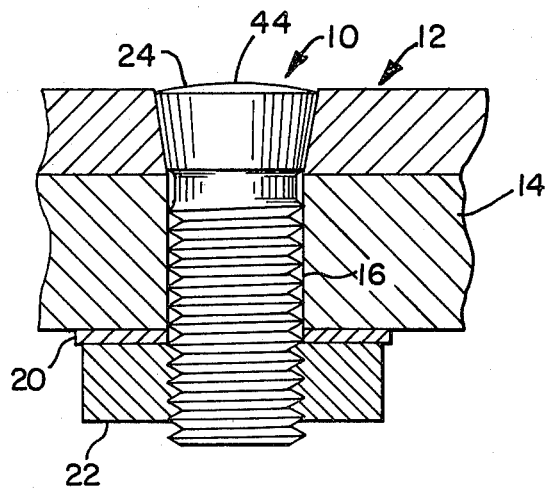
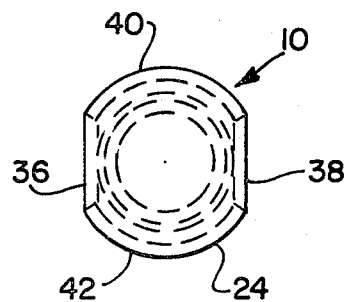
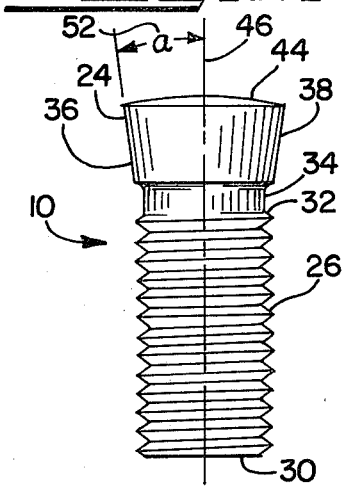
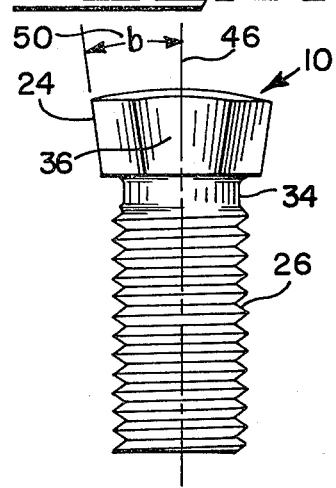

PLOW BOLT

BACKGROUND OF THE INVENTION

1. Field of the Invention

This invention has to do with plow bolts and specifically plow bolts having tapered heads for retaining shins, moldboards and plow shares to a plow frog.

2. Brief Description of the Prior Art

The standard moldboard plow of recent times has evolved into an efficient device with generally perfected elements. The main components of a plow; the frog, moldboard, shin and plow share, have not changed significantly within recent decades. Any significant changes have come in ancillary equipment such as plow carrying structures including tripping and resetting mechanisms, trash deflectors and cover boards. Also, recent metallurgical techniques have improved plow component life significantly. A contemporary plow may have components of laminated metal individually chosen for durability, scour resistance, stress crack prevention and formability. A three-layer sandwich of hard faced steel around a soft center is now in vogue as the state of the art plow material. The hardened ground-contacting face surfaces and the hard back are designed to resist wear while the softer inner layer resists impact stresses and fatigue fractures.

An improved metallurgy plow has recently been made available that has wear characteristics that does not necessitate the use of laminated steel plow structure. The new steel composition allows the plow to wear evenly while resisting stress cracks and fractures. This new type of steel is an improvement over the prior art laminated steel plow components as they would wear out very rapidly after the initial hard thick face of the ground contacting portions of the plow components had been worn through. After this wearing through the soft center of the plow would rapidly wear making the plow components virtually worthless at that point. The newer compositions of steel have a uniform metallurgical structure that allows considerably more wear to occur before the plow components are worn out.

In order to utilize the maximum capacity of these new steel composition components it has been necessary to develop a long wearing hard plow bolt that, as it wears along with the surface of the plow component will still maintain its holding capability when a good portion of its head has been worn away. Thus, it is an object of this invention to provide a plow bolt having wear characteristics that are compatible with new compositions of steel that allow the head to wear with the attached plow components while still maintaining its holding capability.

An advantage of this invention is to improve the holding capability of a standard plow bolt by approximately thirty percent. Also, an advantage of this invention is to provide a plow bolt that is reusable since "pull through" upon the second application is minimized.

It is also an object of this invention to eliminate the square locking hole conventionally used in plow bolt accepting apertures of plow components. By eliminating this square locking hole in the shin and the share components of a plow the highly stressed areas at the locking hole corners produced during the heat treatment quenching operation of the shin and the share will be effectively reduced thus minimizing failures induced in the heat treatment process and in plowing usage.

BRIEF DESCRIPTION OF THE DRAWING FIGURES

The above stated objects and advantages of this invention will be apparent through a perusal of this specification when read in conjunction with the drawing figures in which:

FIG. 1 shows a cross sectional view of a plow bolt maintaining a portion of a plow component to a portion of the plow frog;

FIG. 2 is a side elevation view of a plow bolt;

FIG. 3 is a top view of the plow bolt shown in FIG. 2;

FIG. 4 is a side elevation view of the plow bolt shown in FIG. 2 rotated 90° to show the tapered locking flats.

DETAILED DESCRIPTION OF THE INVENTION

A plow bolt generally 10 is shown in the drawing figures represents a preferred embodiment of the plow bolt of this invention. In all figures identical reference characters signify identical parts. In FIG. 1 the plow bolt generally 10 is shown maintaining a plow component 12, such as shin, share or moldboard to a frog 14. The frog 14 is the supporting structure for the earthworking components of the plow such as the moldboard, shin and plow share. The frog 14 is provided with a through bore 16 through which the plow bolt generally 10 will pass. A lock washer 20 is provided between a fastening nut 22 to secure the plow component generally 12 to the frog 14. The plow bolt generally 10 is provided with a head portion 24 having an inverted truncated cone shape that prevents the head of the bolt from being pulled through the plow component generally 12.

Looking at FIGS. 2, 3 and 4 the plow bolt itself can be readily understood. The plow bolt has an elongated threaded body 26 with a first and a second end, 30 and 32 respectively. A transition collar 34 connects the second end of the elongated threaded body to the head portion 24. The head portion 24 is generally an inverted truncated cone having diametrically opposite planar surfaces 36 and 38 as well as diametrically opposite curvalinear surfaces 40 and 42 adjacent each of the diametrically opposite planar surfaces.

The inverted truncated cone of the head portion 24 is provided with a convex base 44 that will be exposed as a ground contacting surface when the plow is being utilized. The plow bolt is shown with a constructed longitudinal centerline 46 useful in illustrating that the included angle of the curvalinear surfaces, 50 in FIG. 4 and the planar surfaces 52 in FIG. 2 relative to the centerline are similar. In the preferred embodiment of this invention it has been determined that the angle "a", i.e. 52, of FIG. 2 and the angle "b", i.e. 50, of FIG. 4 should be identical, however, it is contemplated by the inventors that the angle between the centerline and the diametrically opposite curvalinear surfaces and the angle between the centerline and the diametrically opposite planar surfaces need not be identical but should be at least similar within several degrees. Notice that the planar surfaces are non-parallel surfaces.

In FIG. 4 the plow bolt shown in FIG. 2 has been rotated 90° on the longitudinal centerline so that one of the diametrically opposite planar surfaces such as 36 is presented. Looking at FIG. 3 the planar surfaces 36 and 38 can readily be seen. Notice that the slope of these surfaces extends toward the vertical centerline of the plow bolt as the surfaces progress from the convex surface 44 inwardly toward the transition collar 34. In the actual utilization of this plow bolt the plow component, be it a moldboard, shin or share shown generally as 12 in FIG. 1, will be provided with an aperture having inclined sides with a larger diameter at the top than at the bottom to accept the inverted truncated head of the plow bolt. The aperture in the plow component will also be provided with complementary planar flats diametrically opposite each other to interact with the diametrically opposite planar surfaces of the plow bolt. These flats will prevent the plow bolt from turning when the nut 22 is tightened to fasten the plow component generally 12 to the frog 14. Once the plow component is attached to the frog the plow bolt will be subjected to wear along with the plow component therefore as the plow component generally 12 wears through its contact with the earth being plowed the head 24 of the plow bolt will gradually be worn away. In the past plow bolt heads have been known to fail after wearing less than 0.100", however, it has been found that by providing the diametrically opposite planar surfaces having angles similar to the diametrically opposite curvalinear surfaces of this plow bolt more than 0.100" can be worn off the head and the plow bolt will continue to hold. In addition to this holding ability during wear the specific design of the diametrically opposite planar surfaces or tapered locking flats will provide approximately a thirty percent increase in holding area over standard share bolts thus providing a significant advantage over state of the art plow bolts.

Thus it can be seen that an improved plow bolt has been presented wherein the objects and advantages of this invention have been met. The specific embodiment shown is the preferred embodiment of the invention however other nuances of designer preference are contemplated by the inventors. For instance a longer or a shorter threaded portion may be possible as would a longer or shorter transition collar between the bolt head and the threaded portion. The appended claims are intended to cover all alternatives, modifications and equivalents as may be included within the spirit and scope of the invention as defined by the appended claims.

What is claimed is:

1. In a plow bolt having an elongated threaded body and a head attached coaxially to an end thereof, said head having an inverted truncated generally right circular conical periphery with diametrically opposite planar surfaces superposed thereon, the improvement wherein said planar flat surfaces of said head are disposed at substantially the same angle relative to the axis of said bolt as said circular conical periphery is disposed relative to said axis.

* * * * *